United States Patent
Faass et al.

(10) Patent No.: US 11,594,931 B2
(45) Date of Patent: Feb. 28, 2023

(54) ELECTRIC MACHINE AND HYBRID ELECTRIC AIRCRAFT

(71) Applicant: Rolls-Royce Deutschland Ltd & Co KG, Blankenfelde-Mahlow (DE)

(72) Inventors: Andreas Faass, Munich (DE); Thomas Gleixner, Erlangen (DE); Johannes Heissenberger, Taufkirchen (DE); Andreas Reeh, Nuremberg (DE); Guillermo Zschaeck, Munich (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 71 days.

(21) Appl. No.: 17/046,298

(22) PCT Filed: Apr. 23, 2019

(86) PCT No.: PCT/EP2019/060321
§ 371 (c)(1),
(2) Date: Oct. 8, 2020

(87) PCT Pub. No.: WO2019/206876
PCT Pub. Date: Oct. 31, 2019

(65) Prior Publication Data
US 2021/0083542 A1    Mar. 18, 2021

(30) Foreign Application Priority Data
Apr. 26, 2018    (DE) ..................... 10 2018 206 512.8

(51) Int. Cl.
*H02K 3/48*    (2006.01)
*B64D 27/24*    (2006.01)
(Continued)

(52) U.S. Cl.
CPC ............... *H02K 3/48* (2013.01); *B64D 27/24* (2013.01); *B64D 33/08* (2013.01); *H02K 1/165* (2013.01); *H02K 3/24* (2013.01); *B64D 2027/026* (2013.01)

(58) Field of Classification Search
CPC .. B64D 27/24; B64D 33/08; B64D 2027/026; H02K 1/16; H02K 1/165; H02K 3/24; H02K 3/48; H02K 3/487
(Continued)

(56) References Cited

U.S. PATENT DOCUMENTS 3,261,995 A    7/1966  Stephane
2013/0154432 A1*  6/2013  Leberfinger ........... H02K 3/345
                                                    310/215

(Continued)

FOREIGN PATENT DOCUMENTS

FR    1429995 A    2/1966
JP    2003125548 A    4/2003
(Continued)

OTHER PUBLICATIONS

International Search Report and the Written Opinion for International Patent Application PCT/EP2019/060321 dated Sep. 5, 2019.

*Primary Examiner* — Rashad H Johnson
(74) *Attorney, Agent, or Firm* — Lempia Summerfield Katz LLC

(57) ABSTRACT

An electric machine includes at least one stator having at least one individual-tooth winding carrier that has at least one spacer configured to space apart turns of an individual-tooth winding mounted on the individual-tooth winding carrier. A hybrid electric aircraft has an electric machine of this kind.

19 Claims, 5 Drawing Sheets

Figure 1:
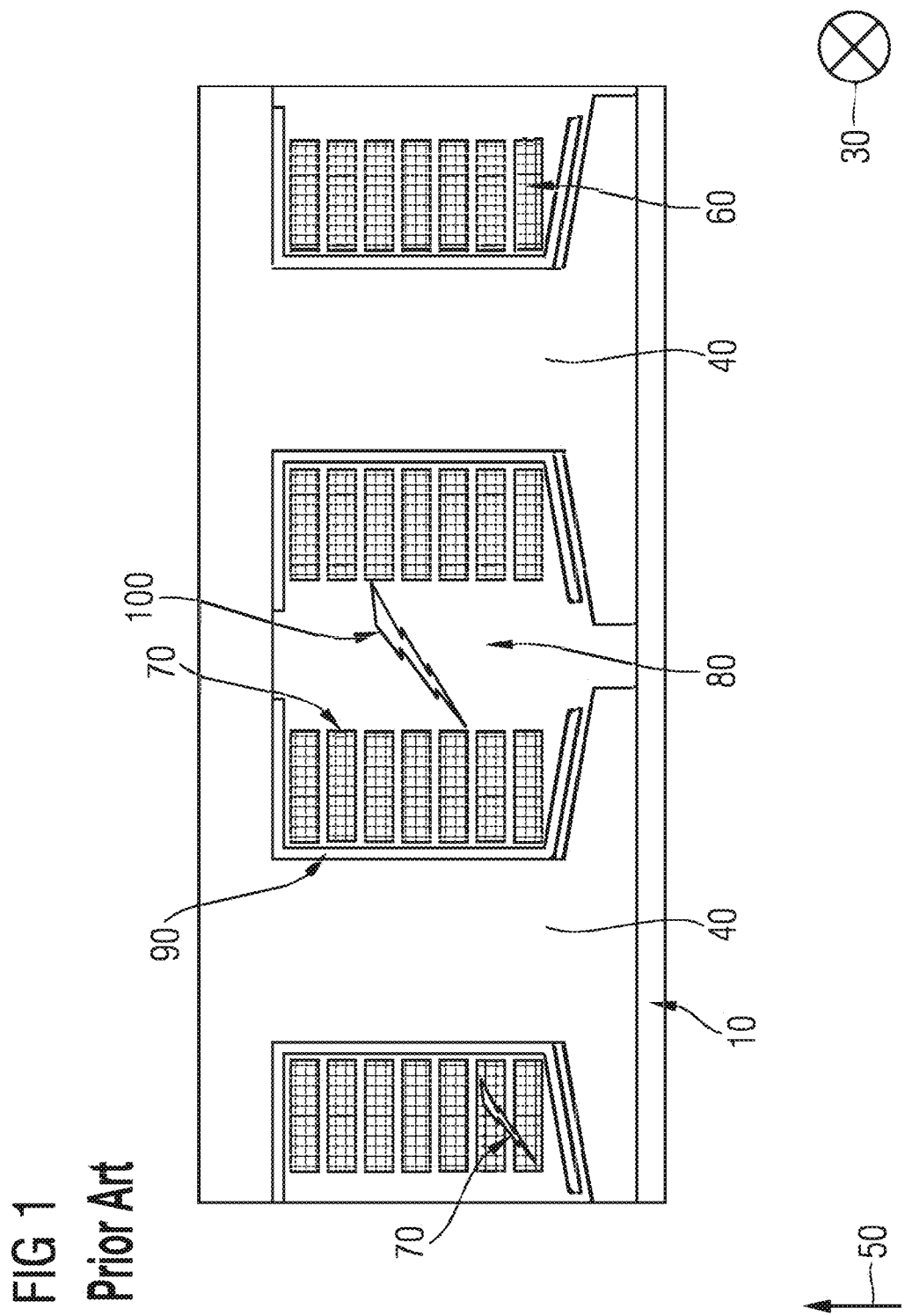

(51) Int. Cl.
*B64D 33/08* (2006.01)
*H02K 1/16* (2006.01)
*H02K 3/24* (2006.01)
*B64D 27/02* (2006.01)

(58) Field of Classification Search
USPC .............. 310/179, 180, 181, 182, 184, 185, 310/216.001, 216.115
See application file for complete search history.

(56) References Cited

U.S. PATENT DOCUMENTS

| | | | |
|---|---|---|---|
| 2015/0022050 A1* | 1/2015 | Sawada | H02K 3/30 |
| | | | 310/215 |
| 2016/0276888 A1* | 9/2016 | Dickinson | H02K 15/045 |
| 2020/0161918 A1* | 5/2020 | Almeida E Silva | H02K 3/12 |
| 2020/0169136 A1* | 5/2020 | Sercombe | H01F 27/08 |
| 2022/0014062 A1* | 1/2022 | Almeida E Silva | H02K 9/197 |
| 2022/0021259 A1* | 1/2022 | Almeida E Silva | H02K 9/19 |

FOREIGN PATENT DOCUMENTS

| | | |
|---|---|---|
| SU | 817870 A1 | 3/1981 |
| WO | 2015021977 A2 | 2/2015 |

\* cited by examiner

ELECTRIC MACHINE AND HYBRID ELECTRIC AIRCRAFT

This application is the National Stage of International Application No. PCT/EP2019/060321, filed Apr. 23, 2019, which claims the benefit of German Patent Application No. DE 10 2018 206 512.8, filed Apr. 26, 2018. The entire contents of these documents are hereby incorporated herein by reference.

BACKGROUND

The present embodiments relate to an electric machine and to a hybrid electric aircraft.

Permanently excited synchronous rotating field machines allow high power and torque densities. Such rotating field machines have a stator with concentrated windings that may be formed by flat conductors. In this way, high slot space factors, short end windings, and thus a high space and weight efficiency may be achieved.

Concentrated windings, however, generate a step-shaped field wave, which causes eddy current losses in permanent magnets of the rotor. Owing to the inductive coupling of the rotor field into the stator, power losses disadvantageously occur in the coils, severely limiting the power of the electric machine. This is because subconductors of the coils are to not exceed a certain temperature to provide that insulating material of the individual conductors and slot insulators is not damaged. Windings are therefore to be cooled in a very efficient way.

The insulation of individual conductors of the turns is critical since high currents may occur in shorted turns owing to induction due to the rotating field, and these may lead to large temperature rises. Owing to these temperature rises, the insulating material may sustain further damage, and a total failure of the entire electric machine may therefore be the result. There is also a high risk of fire, and this cannot be accepted, particularly in the case of aircraft.

Hitherto, excessive coil temperatures in normal operation have been avoided by limiting the current density and providing convective cooling measures in the stator.

There is also a known practice of allowing a flow of cooling liquid around the windings using "direct cooling". Electrically insulating synthetic oils (e.g., silicone oils) are used as the cooling liquid. However, silicone oils have a flashpoint and are thus potentially inflammable, which so far likewise represents a risk of fire.

In the case of "individual-tooth windings", each individual tooth is embodied as a coil, representing a risk of an electric short circuit owing to the potential differences between adjacent individual-tooth winding sides. It is therefore often necessary to provide a spatial distance between the individual-tooth windings, where space between the individual-tooth windings may be used for cooling channels through which the cooling oil flows.

SUMMARY AND DESCRIPTION

The scope of the present invention is defined solely by the appended claims and is not affected to any degree by the statements within this summary.

The present embodiments may obviate one or more of the drawbacks or limitations in the related art. For example, an electric machine having individual-tooth windings that provides improved operational reliability, such as improved overload capacity, is provided. As another example, improved electric insulation and improved heat dissipation are also provided. As yet another example, an improved hybrid electric aircraft is provided.

The electric machine according to the present embodiments includes at least one stator having at least one individual-tooth winding carrier. The at least one individual-tooth winding carrier has at least one spacer that is configured to space apart turns of an individual-tooth winding mounted on the individual-tooth winding carrier.

For example, spacing apart of turns may be spacing apart of turns that are adjacent and/or closest together.

In the electric machine according to the present embodiments, the at least one spacer may be configured to space apart a number (e.g., a plurality) of (e.g., all of) the turns of an individual-tooth winding arranged on the individual-tooth winding carrier.

According to the present embodiments, efficient and effective direct cooling of the individual-tooth winding may be achieved by spatial separation of the individual conductors of an individual-tooth winding. Using spacers in the end windings, the individual conductors of an individual-tooth winding are held apart. In comparison with conventional coils having flat wires, a significantly higher exposed surface is obtained, which contributes linearly to the level of heat flow that may be transmitted. The spaces between the individual conductors of the individual-tooth winding may be used as cooling channels.

By virtue of the spacing apart of the turns of the at least one individual-tooth winding, this at least one individual-tooth winding and consequently the electric machine is advantageously less susceptible to thermal damage to insulation of the individual conductors, or mechanical damage caused thereto by vibration; consequently, the electric machine is of particularly operationally reliable and overload-resistant design. In advantageous developments, it is possible, for example, to dispense with the electric insulation of individual conductors of an individual-tooth winding, advantageously further improving heat transfer. According to the present embodiments, a higher overload capacity of the machine is therefore possible.

In the electric machine according to the present embodiments, functional integration of efficient direct cooling and higher operational reliability may therefore advantageously be achieved by virtue of the spatial distancing of the individual turns of the at least one individual-tooth winding of the stator. The increased surface area for direct cooling allows higher current densities in the individual conductors of the individual-tooth winding and hence a higher overload capacity of the electric machine. According to the present embodiments, the hitherto unsolved problem of turn short circuits due to insulation failure is avoided by spacing apart the turns. Short circuits between the individual-tooth windings may be avoided by the use of insulating material between adjacent individual-tooth windings.

The electric machine according to the present embodiments may include at least one individual-tooth winding that is in each case arranged on the at least one individual-tooth winding carrier (e.g., the electric machine includes the at least one individual-tooth winding).

In one embodiment of the electric machine, the electric machine is a permanently excited rotating field machine. In the case of permanently excited rotating field machines, high power and torque densities may be achieved, where the solution according to the present embodiments allows the use of concentrated windings in an operationally reliable manner.

In the case of the electric machine according to the present embodiments, the at least one spacer is appropriately configured to space apart the turns with a free clearance of, for example, at least one eighth, at least one fifth, or at least one quarter of the height of a turn (e.g., a dimension of the turns in a radial direction, such as a direction oriented perpendicularly to an axis of rotation of the rotor). In this development of the present embodiments, a sufficient spacing to form cooling channels may be achieved for typical winding dimensions.

In the case of the electric machine according to the present embodiments, the at least one spacer is configured, in a development, to space apart the turns by a free clearance, between the turns, of at least 0.1 mm, at least 0.175 mm, or at least 0.25 mm. In this development of the present embodiments, sufficiently large spacings to form cooling channels are implemented. The spacings for individual-tooth windings of typical permanently excited rotating field machines are sufficiently large to simultaneously provide electric insulation of the turns with respect to one another. In other words, owing to the small potential differences between individual turns of an individual-tooth winding, the spacings required for electric insulation between the turns are so small that these spacings are already significantly exceeded by the spacings required to form cooling channels.

The electric machine according to the present embodiments includes a stator having an axis of rotation and at least two individual-tooth winding carriers. Each of the at least two individual-tooth winding carriers extends away from the axis of rotation, transversely to the axis of rotation, in a radial direction. The at least one spacer is on the at least two individual-tooth winding carrier and is configured to space apart the turns in this radial direction (e.g., a direction oriented perpendicularly to an axis of rotation of the rotor).

In the electric machine according to the present embodiments, the at least two individual-tooth winding carriers may be spaced apart from one another in the circumferential direction by, for example, at most 2.5 times the width of individual conductors of the turns and/or of the individual-tooth winding or by, for example, at most 2.25 times the width. The turns may be formed with flat conductors. The width of the individual conductors of the turns may be interpreted as the width (e.g., the maximum dimension of the conductor transversely to the line direction thereof). In the context of this development, phrase "spaced apart by a certain width" may be that the clear width between the individual-tooth winding carriers amounts to the certain width, without taking into account turns or individual-tooth windings.

The electric machine according to the present embodiments has individual-tooth winding insulators that are arranged between the individual-tooth winding carriers in order to insulate the individual-tooth windings from one another. When using an insulating material between two individual-tooth windings, the space between the coils is no longer required by the now present cooling channels between the turns of the individual-tooth winding; therefore, similar slot space factors to those in known solutions may be achieved by raising and narrowing the slot.

The electric machine according to the present embodiments may have one or more cooling channels. Each of the one or more cooling channels has a cooling fluid path configured to enable flow through a gap situated between the turns. It is appropriate if the one or more cooling channels are configured to carry synthetic oil.

The hybrid electric aircraft according to the present embodiments has an electric machine according to the present embodiments, as described above.

The hybrid electric aircraft may include a cooling circuit, where, as explained in one of the above developments, the electric machine has one or more cooling channels and the one or more cooling channels are part of the cooling circuit.

DETAILED DESCRIPTION

Figure 2:
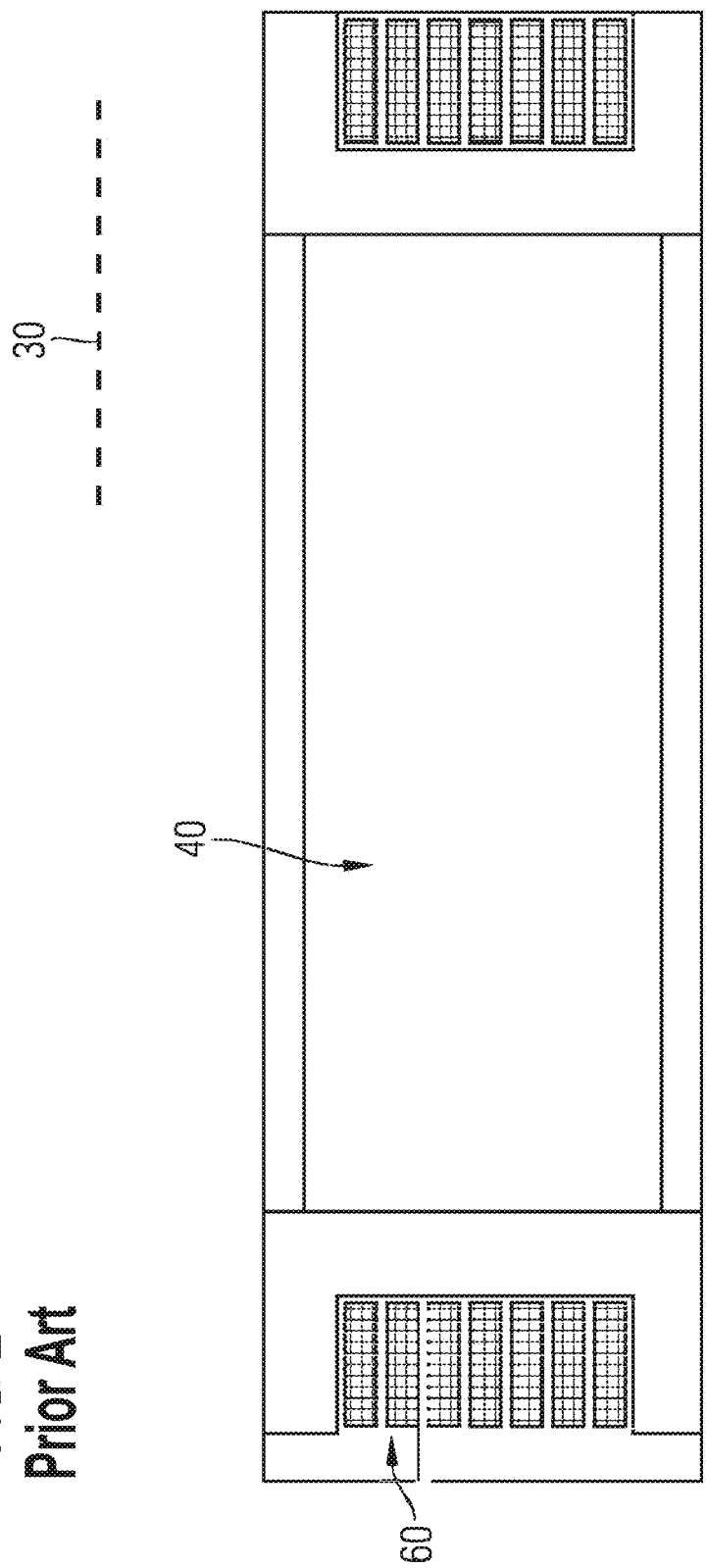
Figure 3:
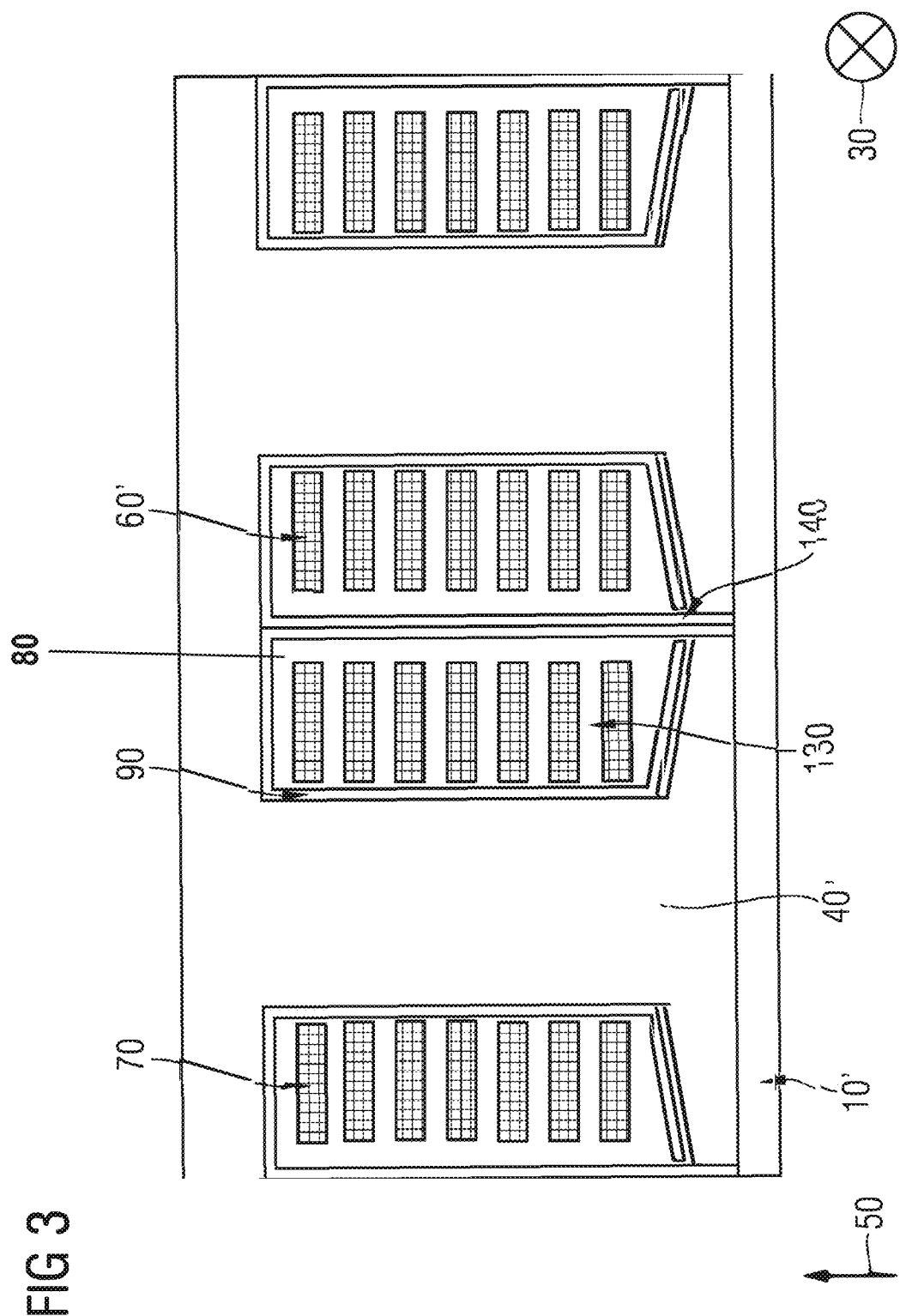
Figure 4:
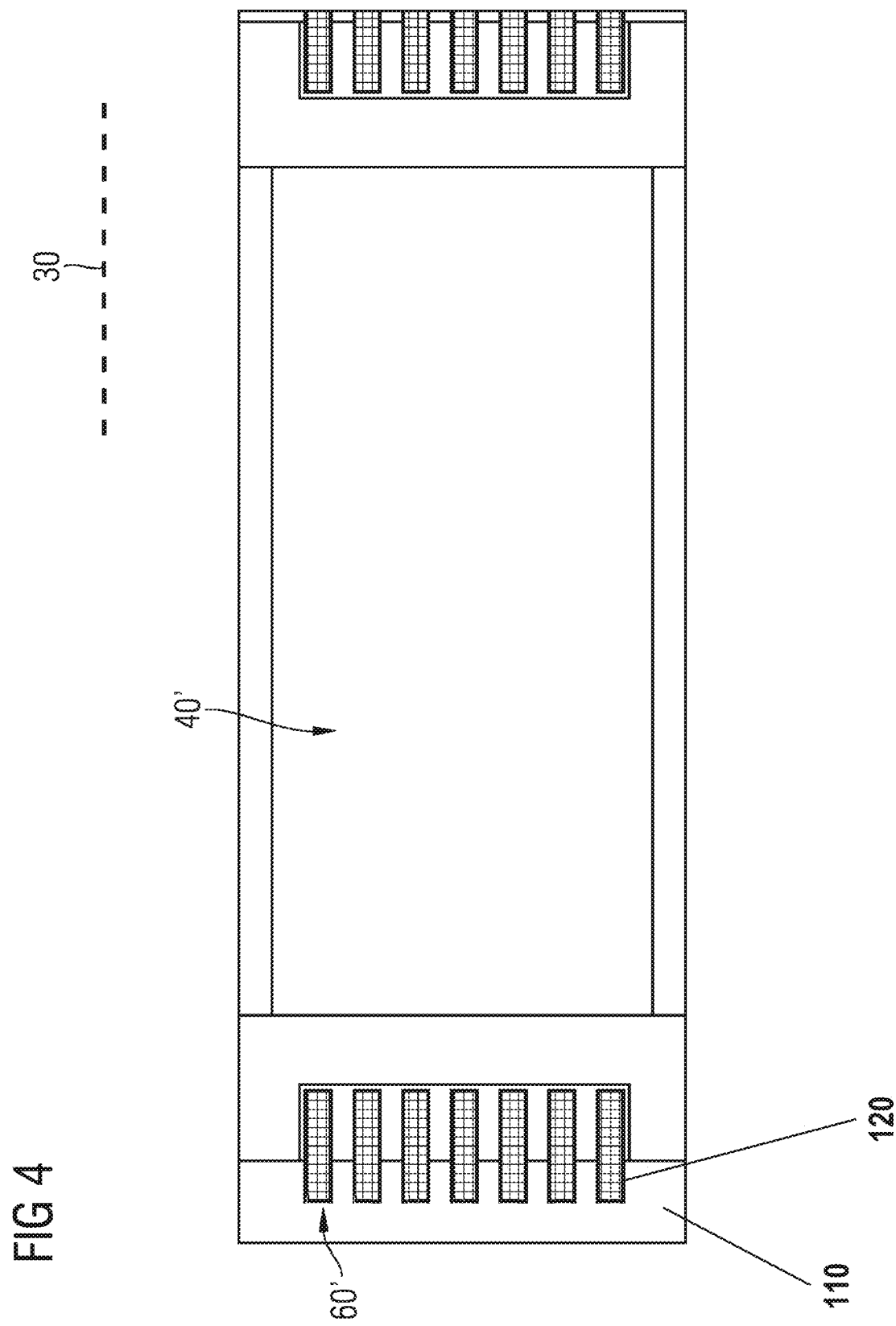
Figure 5:
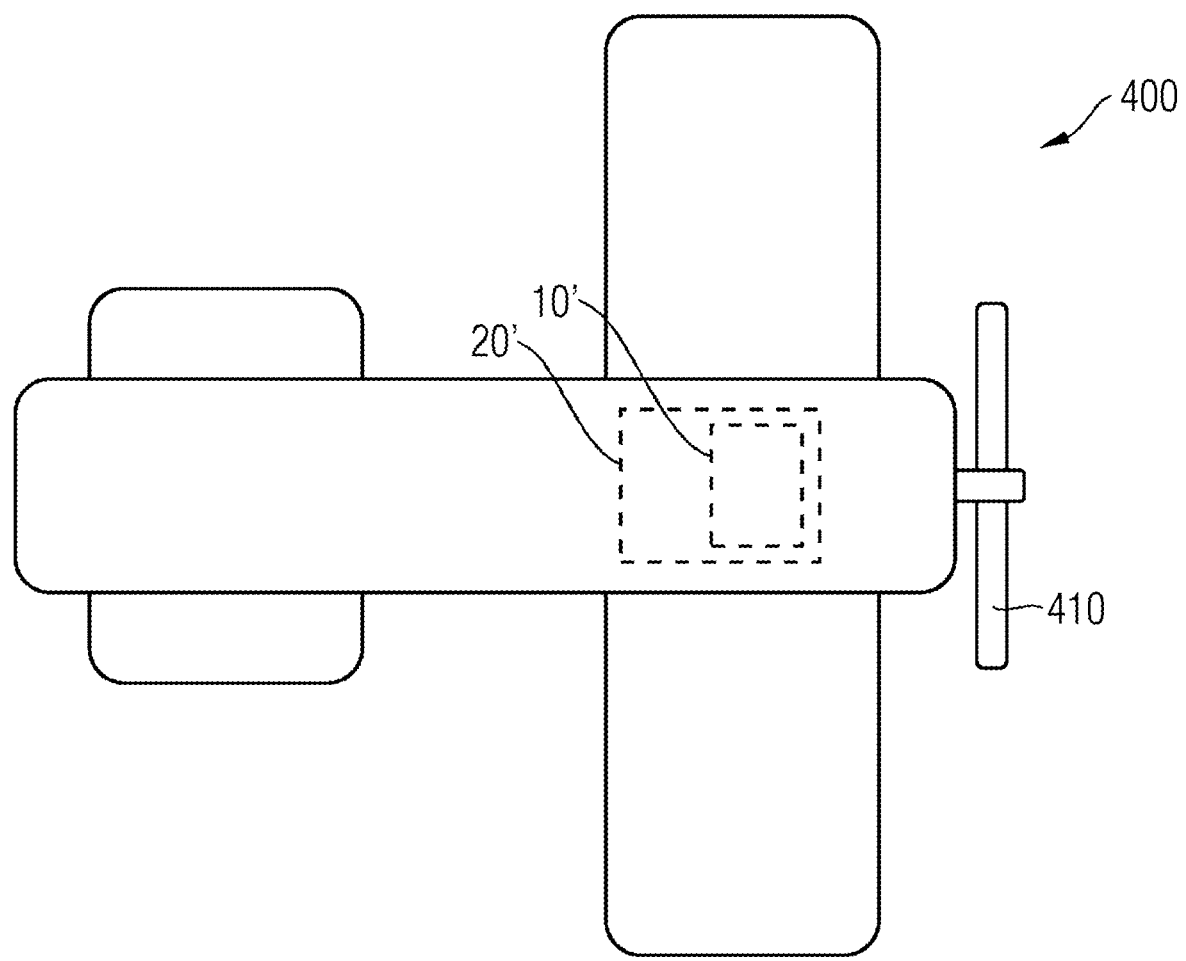

FIG. 1 schematically shows a cross section of part of a stator of a known permanently excited rotating field machine having two individual-tooth windings;

FIG. 2 schematically shows the part of the stator according to FIG. 1 in longitudinal section;

FIG. 3 schematically shows part of a cross section of a stator of a permanently excited rotating field machine according to an embodiment;

FIG. 4 schematically shows the part of the stator according to FIG. 3 in longitudinal section; and FIG. 5 schematically shows a plan view of a hybrid electric airplane according to an embodiment.

DETAILED DESCRIPTION

The stator illustrated in FIG. 1 is a stator 10 of a permanent-magnet-excited rotating field machine 20. The stator 10 is configured for rotation about an axis of rotation, from which a plurality of individual-tooth winding carriers 40 extend away in a radial direction 50.

The individual-tooth winding carriers 40 carry individual-tooth windings 60, which are wound around the individual-tooth winding carriers 40 in individual turns 70. The turns 70 are formed with a flat conductor that has, for example, a height of one millimeter and a width of four millimeters. In this case, the flat conductor is arranged such that the height thereof extends in the radial direction 50, and the width thereof extends in the circumferential direction (e.g., in a direction perpendicular to the radial direction 50 and to a direction 30 parallel to the axis of rotation).

The turns 70 are wound in contact with one another around individual-tooth winding carriers 40 in the radial direction 50. In the radial direction 50, the individual-tooth windings 60 have, for example, ten turns 70 and consequently a dimension of, for example, about 10 millimeters.

The individual-tooth winding carriers 40 are spaced apart by, for example, about 11.3 millimeters in the circumferential direction, opening up between the individual-tooth windings a cooling channel 80 that is, for example, 3.3 millimeters wide in the circumferential direction and by which the individual-tooth windings 60 may be cooled. During the operation of the rotating field machine 20, there is a flow of synthetic oil forming an electric insulator through the cooling channel 80 in order to cool the individual-tooth windings 60.

The individual-tooth windings 60 are electrically insulated with respect to the individual-tooth winding carriers 40 by slot insulation 90. In the illustrative embodiment illustrated, the slot insulation 90 is formed by a surface insulating material (e.g., an aramid laminate). The individual turns 70 of the individual-tooth windings 60 are electrically insulated from one another by turn insulators 70, thus making it possible to avoid voltage flashovers 100.

The stator 10' illustrated in FIG. 3 is a stator 10' of a permanently excited rotating field machine 20' according to the present embodiments. The stator 10' is likewise rotatable about an axis of rotation and, like the stator 10 described above, has individual-tooth winding carriers 40' for individual-tooth windings 60'. According to the present embodiments, the winding carriers 40' each have a comb-like element 110 having mutually spaced recesses 120, as illustrated in FIG. 4. The recesses 120 of the comb-like element 110 are configured to accommodate turns 70' of the individual-tooth windings 60' and to space the turns 70' apart.

Like the turns 70 described above, the turns 70' of the individual tooth windings 60' are formed with a flat conductor that has a height of, for example, one millimeter and a width of, for example, four millimeters. In this case, the flat conductor is likewise arranged such that the height thereof extends in the radial direction 50 and the width thereof extends in the circumferential direction (e.g., in a direction perpendicular to the radial direction 50 and to a direction 30 parallel to the axis of rotation).

In this case, the turns 70' of the individual-tooth windings 60' are spaced apart by the comb-like element 110 such that the turns 70' enclose between the turns 70' a clear width of, for example, 0.3 millimeters. Owing to this additional clear width, the individual-tooth windings 60' have an extent that is, for example, a few millimeters greater in the radial direction 50.

Owing to the spacing of the turns 70' of the individual-tooth windings 60' in the radial direction 50, the turns 70' open up radially between the turns 70' cooling channels 130, through which cooling fluid in the form of synthetic oil, which forms an electric insulator, flows in order to cool the individual-tooth windings 60'.

Owing to the opening up of cooling channels 130 between the turns 70', it is possible to dispense with a cooling channel 80 in the circumferential direction between the individual-tooth winding carriers 40'. Instead, as shown in FIGS. 3 and 4, it is possible to provide an insulator 140 that requires less than, for example, 2 millimeters of the gap provided between the individual-tooth windings 60'. The insulator 140 is formed as a dividing wall composed of the same material as the slot insulation 90. The dividing wall extends in a plane (e.g., in the radial direction 50 and in the direction 30 parallel to the axis of rotation). Owing to the smaller gap in the circumferential direction provided between the individual-tooth windings 60', the individual-tooth windings 60' are spaced apart by less than, for example, 2.25 times the width of the flat conductors of the turns 70'.

In the illustrative embodiment, the turns 70' are not specially insulated but are electrically insulated to a sufficient extent by the spacing apart thereof and the synthetic oil flowing without bubbles through the cooling channels 130. In other illustrative embodiments, not specially illustrated, there may also be insulation of the turns 70'.

As illustrated in FIG. 5, the hybrid electric airplane 400 according to the present embodiments has a rotating field machine 20' according to the present embodiments, having a stator 10', for driving a propeller 410 and/or a power unit (not illustrated in the drawing).

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. An electric machine comprising:
   at least one stator, a stator of the at least one stator having an axis of rotation and at least one individual-tooth winding carrier, the at least one individual-tooth winding carrier having at least one spacer, a spacer of the at least one spacer being configured to space apart turns of an individual-tooth winding mounted on an individual-tooth winding carrier of the at least one individual-tooth winding carrier in a radial direction, the radial direction being transverse to the axis of rotation,
   wherein the spacer includes a comb-like structure configured to space apart the turns of the individual-tooth winding mounted on the individual-tooth winding carrier, the comb-like structure having a body and an extension extending away from the body of the comb-like structure in a direction parallel to the axis of rotation, between two of the turns of the individual-tooth winding.

2. The electric machine of claim 1, wherein the spacer is configured to space apart a number of the turns of the individual-tooth winding arranged on the individual-tooth winding carrier.

3. The electric machine of claim 2, wherein the spacer is configured to space apart all of the turns of the individual-tooth winding arranged on the individual-tooth winding carrier.

4. The electric machine of claim 1, wherein the electric machine is a permanently excited rotating field machine.

5. The electric machine of claim 1, wherein the spacer is configured to space apart the turns by a free clearance of at least one-eighth of a height of a turn.

6. The electric machine of claim 5, wherein the spacer is configured to space apart the turns by a free clearance of at least one-fifth of the height of the turn.

7. The electric machine of claim 6, wherein the spacer is configured to space apart the turns by a free clearance of at least one-quarter of the height of the turn.

8. The electric machine of claim 1, wherein the spacer is configured to space apart the turns by a free clearance of at least 0.1 mm.

9. The electric machine of claim 8, wherein the spacer is configured to space apart the turns by a free clearance of at least at least 0.175 mm.

10. The electric machine of claim 9, wherein the spacer is configured to space apart the turns by a free clearance of at least 0.25 mm.

11. The electric machine of claim 1, wherein the at least one individual-tooth winding carrier includes at least two individual-tooth winding carriers, each of the at least two individual-tooth winding carriers extending away from the axis of rotation, transversely to the axis of rotation, in a radial direction, the at least one spacer being on the at least two individual-tooth winding carriers and being configured to space apart the turns in the radial direction.

12. The electric machine of claim 11, wherein the at least two individual-tooth winding carriers are spaced apart from one another in a circumferential direction by at most 2.5 times a width of individual conductors of the turns, of the individual-tooth winding, or of the individual conductors of the turns and of the individual-tooth winding.

13. The electric machine of claim 12, wherein the at least two individual-tooth winding carriers are spaced apart from one another in the circumferential direction by at most 2.25 times the width of individual conductors of the turns, of the individual-tooth winding, or of the individual conductors of the turns and of the individual-tooth winding.

14. The electric machine of claim 11, further comprising individual-tooth winding insulators that are arranged between adjacent individual-tooth winding carriers of the at least two individual-tooth winding carriers, such that the individual-tooth windings mounted on the adjacent individual-tooth winding carriers, respectively, are insulated from one another.

15. The electric machine of claim 14, further comprising slot insulation disposed between the first individual-tooth winding and the first individual-tooth winding carrier.

16. The electric machine of claim 15, wherein the slot insulation is made of a same material as the individual-tooth winding insulators.

17. The electric machine of claim 1, further comprising one or more cooling channels, each of the one or more cooling channels having a cooling fluid path configured to enable flow through a gap situated between the turns.

18. A hybrid electric aircraft comprising:
an electric machine comprising:
at least one stator, a stator of the at least one stator having an axis of rotation and at least one individual-tooth winding carrier, the at least one individual-tooth winding carrier-having at least one spacer, a spacer of the at least one spacer being configured to space apart turns of an individual-tooth winding mounted on an individual-tooth winding carrier of the at least one individual-tooth winding carrier in a radial direction, the radial direction being transverse to the axis of rotation,
wherein the spacer includes a comb-like structure configured to space apart the turns of the individual-tooth winding mounted on the individual-tooth winding carrier, the comb-like structure having a body and an extension extending away from the body of the comb-like structure in a direction parallel to the axis of rotation, between two of the turns of the individual-tooth winding.

19. The hybrid electric aircraft of claim 18, further comprising a cooling circuit,
wherein the electric machine further comprises one or more cooling channels, each of the one or more cooling channels having a cooling fluid path configured to enable flow through a gap situated between the turns, and
wherein the one or more cooling channels are part of the cooling circuit.

\* \* \* \* \*